United States Patent
Li et al.

(10) Patent No.: US 7,324,173 B2
(45) Date of Patent: Jan. 29, 2008

(54) SIDE FIXING FRAME FOR A LIQUID CRYSTAL DISPLAY DEVICE

(75) Inventors: Szu-Han Li, Jungli (TW); Yung-Pin Chuang, Chaochou Town (TW); Li-Huang Lu, Chuangli (TW); Deng-Kuen Shiau, Gongliao Township, Taipei County (TW)

(73) Assignee: Quanta Display Inc., Tao Yuan Shien (TW)

( * ) Notice: Subject to any disclaimer, the term of this patent is extended or adjusted under 35 U.S.C. 154(b) by 0 days.

(21) Appl. No.: 10/801,688

(22) Filed: Mar. 17, 2004

(65) Prior Publication Data
US 2005/0206799 A1    Sep. 22, 2005

(30) Foreign Application Priority Data
Jan. 12, 2004  (CN)  ................................ 93 1 00729

(51) Int. Cl.
*G02F 1/1333* (2006.01)
(52) U.S. Cl. .......................................... 349/60; 349/58
(58) Field of Classification Search ............. 349/58–60
See application file for complete search history.

(56) References Cited
U.S. PATENT DOCUMENTS
6,392,723 B1 * 5/2002 Sugiyama et al. ............ 349/58

6,542,206 B1    4/2003  Saito ............................ 349/58
6,762,807 B2 *  7/2004  Lee et al. ..................... 349/58
2001/0036057 A1 11/2001 Fukuyoshi .................. 361/681

FOREIGN PATENT DOCUMENTS

| JP | 8146269 | 6/1996 |
|---|---|---|
| JP | 8327983 | 12/1996 |
| JP | 10206831 | 8/1998 |
| JP | 2000019512 | 1/2000 |
| JP | 2001194649 | 7/2001 |

\* cited by examiner

*Primary Examiner*—Dung T. Nguyen
(74) *Attorney, Agent, or Firm*—Harold L. Novick; Jerald L. Myer; The Nath Law Group

(57) ABSTRACT

A side fixing frame for a liquid crystal display device is provided. The side fixing frame has a U-shaped configuration and is provided with multiple engaging elements. The engaging elements of the side fixing frame couple with corresponding counterparts of a supporting frame used in a liquid crystal display device so as to fasten the side fixing frame with the supporting frame. Because of the U-shaped configuration design of the side fixing frame, the frame can attain the desired securing strength and reduce the materials needed for producing the side fixing frame and the production cost.

9 Claims, 2 Drawing Sheets

SIDE FIXING FRAME FOR A LIQUID CRYSTAL DISPLAY DEVICE

BACKGROUND OF THE INVENTION

1. Field of the Invention

The present invention relates to a side fixing frame for a liquid crystal display device, and particularly to a U-shaped side fixing frame with multiple engaging elements to couple and to secure a supporting frame of a liquid crystal display device.

2. Description of the Prior Art

As semiconductor fabrication technologies are rapidly advanced, display devices are required to be lighter, smaller and slimmer. This is especially the true for flat panel display devices such as liquid crystal displays and plasma displays. Therefore, the industry endeavors in reducing the number of assembly elements and in simplifying the process to the greatest extent possible.

LCD monitors are widely used for desktop computers and notebook computers. A LCD panel module and a backlight module are respectively assembled using separate assembly processes before both are assembled together. FIG. 1 is a disassembled perspective view of an upper frame 100 and a supporting frame 200 used in the conventional backlight module. The components of the liquid crystal display device such as a reflecting plate, a light guiding plate, a diffusing film and a lamp assembly are assembled together between the upper frame 100 with a central opening and the supporting frame 200, and the LCD panel is disposed directly contacting the upper side of the upper frame 100. There are several engaging elements 101 on the edges of the upper frame 100 to couple with counterparts 201 on the edges of the supporting frame 200 so that the upper frame 100 and supporting frame 200 are fastened and secured. Making liquid crystal display devices lighter and slimmer causes the upper frame 100 to be made very soft and results in the difficulty of mold injection. The assembly also becomes more complicated. To improve the fabrication process, U.S. Pat. No. 6,502,945B2 discloses a stack type backlight module and an assembly method thereof. The stack type backlight module includes a mold frame, a reflecting plate, a light guiding plate placed on the reflecting plate, a pair of lamp assemblies respectively accommodated at each side of the light guiding plate, diffusing plates placed on the light guiding plate and a pair of fixing frames facing each other covering the edge of the light guiding plate also detachably coupled to the mold frame.

U.S. Pat. No. 6,502,945B2 utilizes two L-shaped mold frames and a supporting frame to serve as a support for assembling other components. The L-shaped mold frames are coupled with the supporting frame to fasten the other components. The L-shaped mold frames need sufficient width to firmly support the LCD panel disposed on it. This reduces the view field of the liquid crystal display panel, and increasing the overall size and weight of the backlight module. Hence, it is necessary to provide an assembling method, which can utilize mold frames with narrower edge to firmly support and secure the stack type backlight assembly. The process for narrowing down the edge of the mold frame is called "edge-narrowing".

Additionally, to save the material of the mold frame and reduce the cost of assembling the backlight module, another side mold frame is provided. The side mold frame is provided with a groove for containing the liquid crystal display panel and the backlight module. The side mold frame is also provided with engaging means for coupling and securing with the supporting frame. The side mold frame supports and secures the whole stack backlight module by means of the grooves and the engaging means. The materials needed for producing the side mold frame is less than that of the known upper frame 100. However, to attain a good securing effect, the edge of the side mold frame can not be made too narrow; otherwise, the good securing effect can not be provided. To meet the requirement for making the size of the liquid crystal display panels larger, the securing effect provided by the coupling strength of the groove of the side mold frame becomes worse. The resistant force of the side mold frame against the external torque becomes smaller, and resulting in the side mold frame to be easily detached from the stack type backlight module. Hence, the securing strength of the side mold frame is still not enough, and the view field size of liquid crystal devices with the side mold frame is less than that of devices with the upper frame 100.

To overcome the above drawbacks, the present invention is created.

SUMMARY OF THE INVENTION

One objective of the present invention is to provide a side fixing frame for liquid crystal display devices, which has a U-shaped configuration and is provided with multiple engaging elements to couple and secure to a supporting frame of the liquid crystal display device.

The side fixing frame of the present invention has a U-shaped configuration and is provided with multiple engaging elements to couple and secure to the supporting frame. Thus, the present side fixing frame can provide a securing strength like that provided by the conventional device.

Besides, the amount of materials used for producing the side fixing frame of the present invention can be reduced to less than one half of materials currently used. Both the materials for mold injection and molding time are reduced. The purpose of reducing the production cost can be fulfilled.

Moreover, the securing purpose can be attained merely by disposing the side fixing frame of the present invention at the two opposite sides of the supporting frame. The assembling process is also simplified.

The fastening means of the present side fixing frame is based on the theory of securing with three points. The edge of the side fixing frame can be made narrower; and this can increase the view field of the liquid crystal display device. Therefore, the present invention increases the view field of the liquid crystal display device comparably more than the conventional device using the side mold frames.

The side fixing frame of the present invention can couple with existing supporting frames. Therefore, there is no need to change the current assembly process. In addition, the purposes of easy assembling, firm securing, reduced molding time, reduced molding material and increased view field will be fulfilled.

BRIEF DESCRIPTION OF THE DRAWINGS

The objectives, features and advantages of the present invention will become apparent from the following detailed description and in light of the accompanying drawings.

DESCRIPTION OF THE EMBODIMENTS

The present invention will be described in detail in accordance with the following embodiments with reference to the accompanying drawings.

Figure 1:
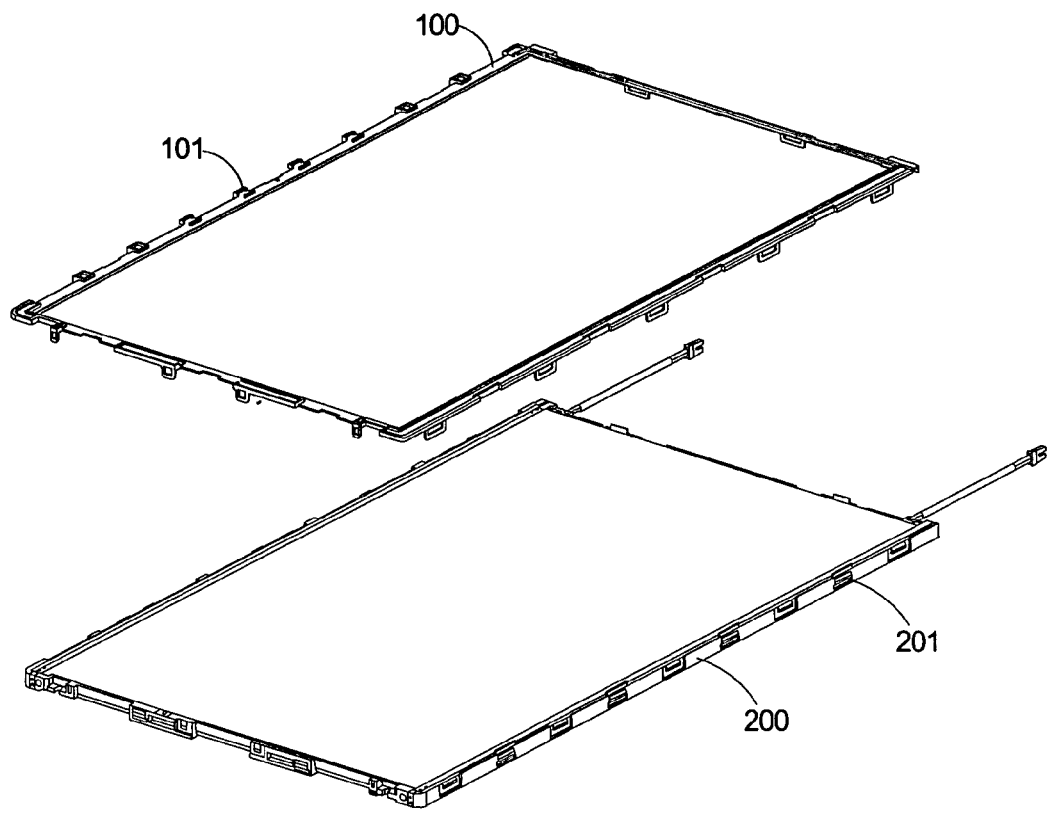
FIG. 1 is a disassembled perspective view of an upper frame and a supporting frame used in the conventional backlight module.
Figure 2:
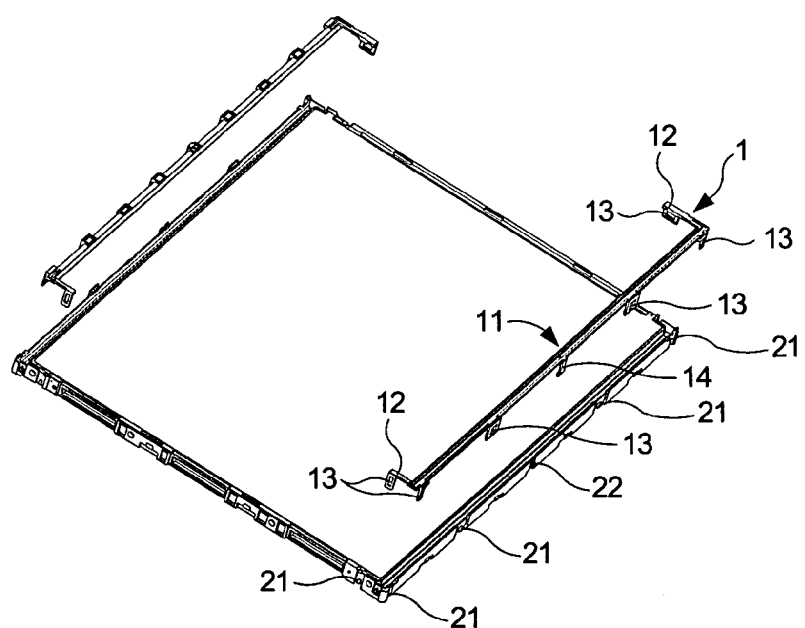
FIG. 2 is a disassembled perspective view of a supporting frame and two side fixing frames of the present invention.
Figure 3:
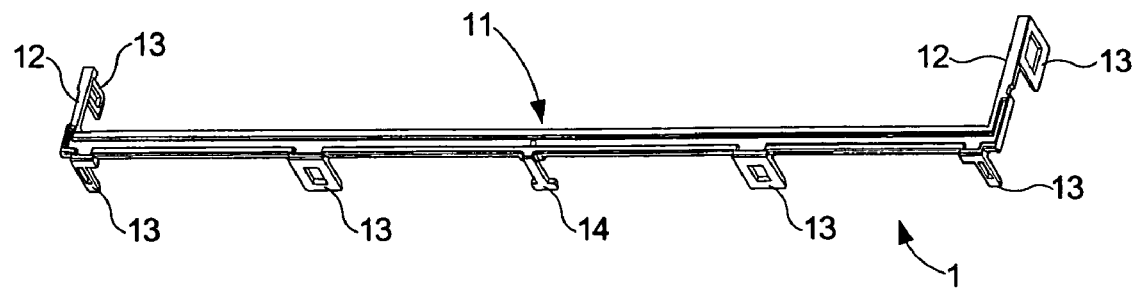
FIG. 3 is a perspective view of the side fixing frame of FIG. 2.

FIG. 2 is a disassembled perspective view of a supporting frame and two side fixing frames 1 of the present invention. FIG. 3 is a perspective view of the side fixing frame 1 of the present invention. A LCD panel (not shown) is disposed directly contacting the upper side of the side fixing frame 1. The components of the backlight module such as a light guiding plate, a reflecting plate are disposed between the supporting frame and the side fixing frame 1 to form the backlight module of the LCD device. The side fixing frame 1 substantially includes a frame body 11 and a pair of extended parts 12. The frame body 11 and the extended parts 12 form a U-shaped configuration. The frame body 11 is provided with multiple of engaging elements 13 and 14, and one end of each of the extended parts 12 is provided with at least one engaging element 13. The number of the engaging elements 13 and 14 of the frame body 11 is not limited. However, the engaging elements 13 and 14 on some places of the frame body 11 must match with corresponding counterparts 21 or 22 of the supporting frame. According to mechanical theories, if each of the extended parts 12 is provided with one engaging element 13 and the frame body 11 is provided with one engaging element 13 or 14, the purpose of securing can be attained. Therefore, the frame body 11 can be provided with one or more engaging elements 13 and 14. Alternately, the purpose of securing also can be attained by way of disposing the side fixing frame 1 at one of the two opposite sides of the supporting frame.

Figure 4:
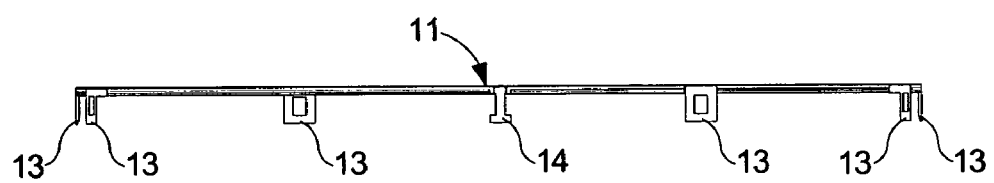
FIG. 4 is a front view of the side fixing frame of FIG. 3.
Figure 5:
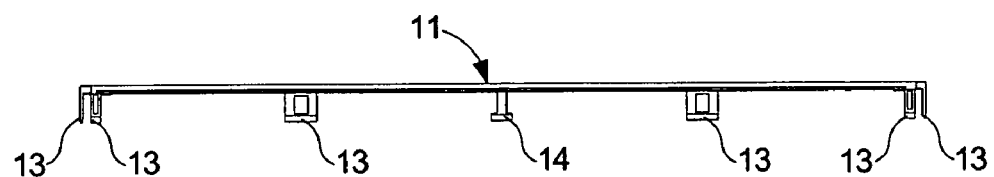
FIG. 5 is a rear view of the side fixing frame of FIG. 4.

FIG. 4 is a front view of the side fixing frame 1 and FIG. 5 is a rear view of the side fixing frame 1. There are seven engaging elements 13 and 14 on the side fixing frame 1 in the figure. However, the number of the engaging elements 13 and 14 can be fewer or greater than seven as long as the purpose of security can be attained.

The lengths of the two extended parts 12 of the side fixing frame 1 can be equal or unequal to each other. The length of the extended part 12 is not limited if the purpose of security can be attained. The side fixing frame 1 can be made from plastic material by mold injection.

The engaging elements 13 and 14 of the side fixing frame 1 can be a hook-type configuration or trench-type configuration. The corresponding counterparts 21 or 22 of the supporting frame are a trench-type configuration or hook-type configuration. Therefore, the engaging elements 13 and 14 of the side fixing frame 1 can couple with the corresponding counterparts 21 or 22 of the supporting frame. These engaging elements 13 and 14 of the side fixing frame 1 and the corresponding counterparts 21 or 22 of the supporting frame also can be a recess configuration, a protrusion configuration or any other configuration that allows the engaging elements 13 and 14 of the side fixing frame 1 and the corresponding counterparts 21 or 22 of the supporting frame to couple with each other. In other words, the engaging elements 13 and 14 of the side fixing frame 1 can be any configuration as long as the engaging elements of the side fixing frame 1 are counterparts of those of the supporting frame.

When compared to the securing means of the upper frame of a conventional liquid crystal display device, the present invention has the same securing strength as a conventional upper frame though the side fixing frames 1 only need to be placed at the two opposite sides of the support frame. This would result in fewer material used for producing the side fixing frame, and lower production cost.

Besides, the size of the side fixing frame 1 is smaller than that of the known upper frame. Therefore, the molding time in production is significantly reduced and costs can be lowered.

Furthermore, the purpose of security is attained by way of disposing the side fixing frame 1 at the two opposite sides of the supporting frame. The assembling process for the liquid crystal display device is also simplified.

Because of the design of the extended parts 12 of the side fixing frame 1, the side fixing frame 1 can provide a good securing effect by utilizing the theory of securing with three points. The edge of the side fixing frame 1 can be narrowed down; such is called "edge-narrowing" in the present invention. The view field of the liquid crystal display device thus can be enlarged.

The embodiments are only used to illustrate the present invention and are not intended to limit the scope of the invention. Modifications of the embodiments can be made in line with the spirit of the present invention.

What is claimed is:

1. A side fixing frame for a liquid crystal display device, comprising:
   a frame body;
   a pair of extended parts, wherein said frame body and said pair of extended parts form a U-shaped configuration;
   at least one first engaging element integrated with said frame body and protruding downward for coupling with at least one corresponding first counterpart of a supporting frame; and
   at least two second engaging elements respectively integrated with said pair of extended parts and protruding downward for coupling with at least two corresponding second counterpart of said supporting frame used in said liquid crystal display device to fasten said side fixing frame with said supporting frame.

2. The side fixing frame of claim 1, wherein the lengths of the pair of said extended parts are substantially equal to each other.

3. The side fixing frame of claim 2, wherein the shapes of said first and second engaging element can be the same or different, and said first and second engaging elements forms a hook-type configuration or trench-type configuration to respectively match said first and second corresponding counterpart of said supporting frame having a trench-type configuration or hook-type configuration.

4. The side fixing frame of claim 2, wherein the shapes of said first and second engaging element can be the same or different, and said first and second engaging element forms a protrusion configuration or recess configuration to respectively match said first and second corresponding counterpart of said supporting frame having a recess configuration or protrusion configuration.

5. The side fixing frame of claim 1, wherein the lengths of the pair of said extended parts are unequal.

6. The side fixing frame of claim 5, wherein the shapes of said first and second engaging element can be the same or different, and said first and second engaging element forms a hook-type configuration or trench-type configuration to respectively match said first and second corresponding counterpart of said supporting frame having a trench-type configuration or hook-type configuration.

7. The side fixing frame of claim 5, wherein the shapes of said first and second engaging elements can be the same or different, and said first and second engaging element forms a protrusion configuration or recess configuration to respectively match said first and second corresponding counterpart of said supporting frame having a recess configuration or protrusion configuration.

8. The side fixing frame of claim 1, wherein the shapes of said first and second engaging element can be the same or different, and said first and second engaging element forms a hook-type configuration or trench-type configuration to respectively match said first and second corresponding counterpart of said supporting frame having a trench-type configuration or hook-type configuration.

9. The side fixing frame of claim 1, wherein the shapes of said first and second engaging element can be the same or different, and said first and second engaging element forms a protrusion configuration or recess configuration to respectively match said first and second corresponding counterpart of said supporting frame having a recess configuration or protrusion configuration.

* * * * *

UNITED STATES PATENT AND TRADEMARK OFFICE
CERTIFICATE OF CORRECTION

| | | |
|---|---|---|
| PATENT NO. | : 7,324,173 B2 | Page 1 of 1 |
| APPLICATION NO. | : 10/801688 | |
| DATED | : January 29, 2008 | |
| INVENTOR(S) | : Li et al. | |

It is certified that error appears in the above-identified patent and that said Letters Patent is hereby corrected as shown below:

Title Page, Item (73) Assignee: should read,

-- (73)     Assignee: AU Optronics Corporation, Hsin-Chu, Taiwan R.O.C. --.

Signed and Sealed this

Fifth Day of October, 2010

David J. Kappos
*Director of the United States Patent and Trademark Office*